United States Patent [19]

Kunz et al.

[11] Patent Number: 4,684,492
[45] Date of Patent: Aug. 4, 1987

[54] REPAIR FIXTURE

[75] Inventors: Rainer Kunz; Jakob Stauner, both of Nuremburg; Robert Weber, Uttenreuth, all of Fed. Rep. of Germany

[73] Assignee: Kraftwerk Union Aktiengesellschaft, Mülheim/Ruhr, Fed. Rep. of Germany

[21] Appl. No.: 735,568

[22] Filed: May 17, 1985

[30] Foreign Application Priority Data

Oct. 9, 1984 [DE] Fed. Rep. of Germany ..... 29682[U]

[51] Int. Cl.⁴ .................. G21C 13/06; F16L 55/18; F17D 3/14
[52] U.S. Cl. .................. 376/203; 376/260; 376/249; 137/315; 137/384
[58] Field of Search ............ 376/249, 248, 250, 203, 376/260, 463; 228/222, 223, 224, 226, 93; 29/722, 723, 402.18, 402.13, 407; 137/15, 315, 317, 384, 388

[56] References Cited

U.S. PATENT DOCUMENTS 3,756,915  9/1973  Matueevich et al. ............... 376/249
4,117,733 10/1978  Gugel ..................... 73/634
4,375,104  2/1983  Starr et al. ........................ 376/203
4,393,899  7/1983  Tsuji et al. ........................ 138/89
4,436,694  3/1984  Vassalotti et al. ................. 376/310
4,470,952  9/1984  Vassalotti ........................ 376/316
4,548,783 10/1985  Dalke et al. ....................... 376/204

FOREIGN PATENT DOCUMENTS 1085961 10/1967  United Kingdom ............... 376/249
0052570  5/1982  European Pat. Off. ............ 376/249

OTHER PUBLICATIONS

Nuclear Engineering International, Oct. 1976, pp. 48 and 68–71.

Primary Examiner—Frederick R. Schmidt
Assistant Examiner—William E. Terrell
Attorney, Agent, or Firm—Herbert L. Lerner; Laurence A. Greenberg

[57] ABSTRACT

A repair fixture for water-cooled nuclear reactors including an openable reactor pressure vessel having a wall, and conduits passing through the pressure vessel wall for flooding the pressure vessel, includes a sealing box disposed in the opened, flooded pressure vessel, a device connected to the sealing box for pressing the sealing box liquid-tightly against the pressure vessel wall enclosing at least some of the conduits, and a device connected to the sealing box for evacuating the conduits enclosed by the sealing box.

22 Claims, 4 Drawing Figures

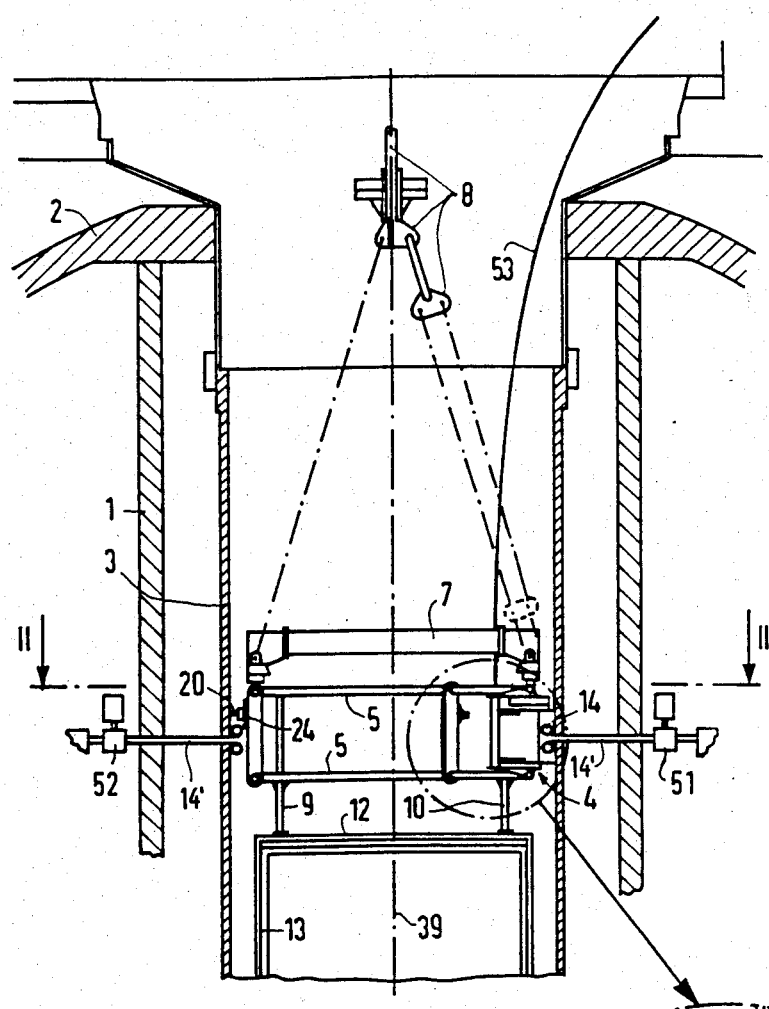
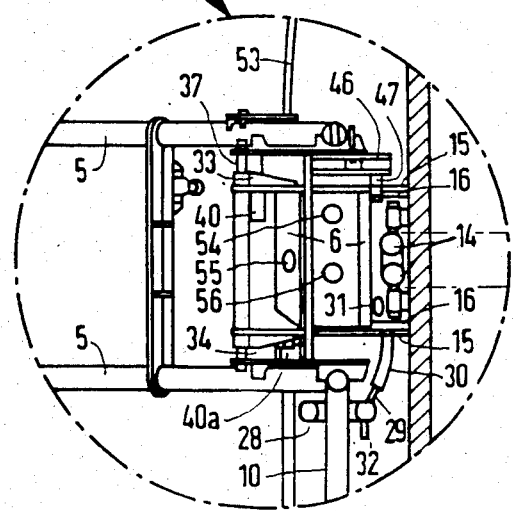
FIG 1

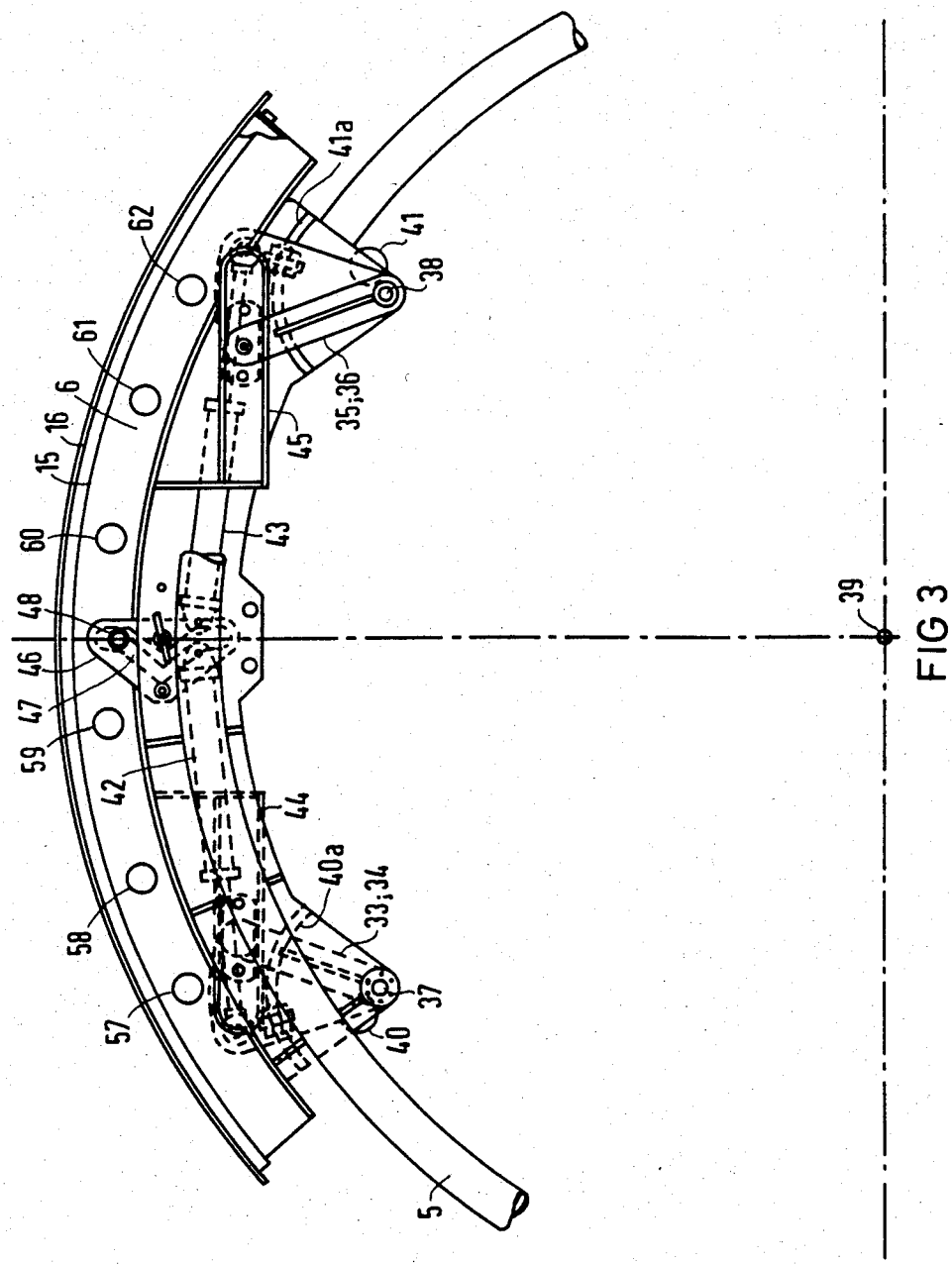

REPAIR FIXTURE

The invention relates to a repair fixture for water-cooled nuclear reactors. When making repairs on the walls of a reactor pressure vessel or when replacing primary shutdown controls of water-cooled nuclear reactors, these primary shutdown controls must be evacuated beforehand. However, this is only possible if the water level in the reactor pressure vessel is lowered to the extent that it is below the level of the primary shutdown controls to be repaired or below the level of the outlets of the respective conduits, such as the feedwater distributors. The same applies when repairs on the walls of the reactor pressure vessel become necessary. In the case of boiling water reactors and pressurized water reactors, this presupposes that all of the fuel elements must first have been removed from the core barrel. This is extremely costly. Moreover, during evacuation of the core barrel and during the lowering of the water level in the reactor pressure vessel, a perceptible radiation exposure of the operating and maintenance personnel is to be expected. Lastly, the lowering of the water level in boiling water reactors requires special shielding measures to be taken for the steam separator and steam dryer.

It is accordingly an object of the invention to provide a repair fixture which overcomes the hereinafore-mentioned disadvantages of the heretofore-known devices of this general type, and to provide means for performing repairs on the primary shutdown controls or even on the walls of a reactor pressure vessel, which can be carried out without having to lower the water level in the reactor pressure vessel.

With the foregoing and other objects in view there is provided, in accordance with the invention, a repair fixture for water-cooled nuclear reactors including an openable reactor pressure vessel having a wall, and conduits passing through the pressure vessel wall for flooding the pressure vessel, comprising a sealing box disposed in the opened, flooded pressure vessel, means connected to the sealing box for pressing the sealing box liquid-proof or tightly, abutting against the pressure vessel wall enclosing at least some of the conduits, and means connected to the sealing box for evacuating the conduits enclosed by the sealing box.

A sealing box which, according to the invention, can be liquid-tightly applied against the pressure vessel wall in the flooded reactor pressure vessel in vicinity of the feedwater distributors or conduit connections, permits the evacuation of covered wall areas including the feedwater distributors and conduit connections present at that location, with the reactor pressure vessel flooded. If primary shutdown controls are placed at the same level or higher, they are then evacuated at the same time. Otherwise, they can be evacuated through the connecting conduits.

In accordance with another feature of the invention, the conduits are feedwater distributors having conduit connections leading to primary shutdown controls of the pressure vessel.

In accordance with a further feature of the invention, there are included means disposed in the sealing box for mounting inspection, testing and treatment equipment.

In accordance with an added feature of the invention, there is provided a support ring lowerable into the pressure vessel, the sealing box being mounted on the support ring. This greatly facilitates handling of the rather bulky sealing box. Such a support ring at the same time helps to transmit to the wall of the reactor pressure vessel, the compressive forces of the sealing box exerted against the inner surface of the wall of the reactor pressure vessel.

In accordance with an additional feature of the invention, there is provided a core barrel disposed in the pressure vessel below the conduits, the support ring including props engaging the core barrel when the support ring is lowered.

In accordance with again another feature of the invention, the support ring has an outer periphery including lateral props engaging the inner surface of the pressure vessel wall for absorbing radial compressive forces of the sealing box.

In accordance with again a further feature of the invention, there are provided setting cylinders displacing the lateral props against the inner surface of the pressure vessel wall.

The very efficient bracing of the support ring on the core barrel of the nuclear reactor defines a reference height of the support ring, from which the further displacement of the sealing box relative to the support ring can occur. At the same time, a crane will be available for other jobs, such as the repositioning of fuel elements, during the running repair measures.

In accordance with again an added feature of the invention, there are provided means for displacing the sealing box in radial or circumferential direction of the support ring.

In accordance with again an additional feature of the invention, the support ring has an axis of symmetry, and including a guide connected to the support ring in which the sealing box is displaceable vertically and parallel to the axis of symmetry. In this way, the sealing box can by-pass or pass behind guide rods extending along and spaced from the pressure vessel wall.

In accordance with yet another feature of the invention, there are provided hydraulic cylinders controlling displacements radially, circumferentially and vertically of the sealing box relative to the support ring.

In accordance with yet a further feature of the invention, there are provided guide cams between the sealing box and the support ring adapted to a given reactor type for forcibly displacing the sealing box in radial direction relative to the support ring. Such cams avoid damage due to improper manipulations which are not impossible, to say the least, with universal, freely selectable hydraulic adjustment.

In accordance with yet an added feature of the invention, the pressure vessel has an axis of symmetry and contains fuel elements including outer fuel elements disposed at a given distance from the axis of symmetry, and the conduits are feedwater distributors protruding into the pressure vessel, and including a support ring on which the sealing box is mounted, the sealing box having a depth in radial direction of the pressure vessel being only that which is absolutely necessary to cover the protrusion of the feedwater distributors, and the support ring and the sealing box leaving an unobstructed inside diameter of the pressure vessel being more than twice the given distance, when the sealing box is pressed against the pressure vessel wall.

In accordance with yet an additional feature of the invention, the sealing box has rims to be pressed against the pressure vessel wall, and sealing lips or gaskets disposed on the rims.

In accordance with still another feature of the invention, each of the gaskets is substantially L-shaped and has a longer and a shorter leg, the longer leg being pressed against the pressure vessel wall and having a narrow sealing edge and a wide sealing lip, and a shallow fillet between the sealing lip and sealing edge.

In accordance with still a further feature of the invention, the evacuating means include a pump. The evacuation of the conduits or feedwater distributors covered by the sealing box can be carried out with this construction.

In accordance with still an added feature of the invention, there is provided a float switch disposed in the sealing box and connected to the pump for controlling the pump.

In accordance with still an additional feature of the invention, the pump is disposed in the sealing box. This simple and expedient solution causes the pump to be switched on automatically if necessary in case of leaks or other intrusions of water.

In accordance with another feature of the invention, the pressure vessel has a given water level, and including an air venting hose connected to the sealing box and leading above the water level.

In accordance with a further feature of the invention, the conduits are in the form of four feedwater distributors connected to the pressure vessel, and including grommets and guides being screwed to the support ring and movable for repositioning along the periphery of the support ring toward the feedwater distributors. The traverses are also needed to manipulate other core inserts, such as water separators and are guided in many nuclear reactor types for automatic coupling or for exact deposition of these core inserts in the pressure vessel area and are not rotatable at will about the axis of symmetry thereof. For this reason, this construction is especially appropriate for covering the feedwater distributors, which are usually offset relative to each other by 90° or 180°. In this way, the sealing box can be repositioned by 90°, 180° or 270°.

In accordance with an added feature of the invention, the support ring is divided into sections. This makes the support ring easier to transport to the site where it is used and to mount it between the inserts.

In accordance with an additional feature of the invention, the sealing box is at least partly transparent.

In accordance with again another feature of the invention, there are provided transparent windows disposed in the sealing box.

In accordance with again a further feature of the invention, there are provided means disposed in the sealing box for mounting at least one light source and a television camera.

In accordance with again an added feature of the invention, the mounting means includes means for moving and adjusting a television camera along the sealing box.

In accordance with a concomitant feature of the invention, the mounting means are in the form of remotely controllable carriers for eddy current testing probes having ultrasonic testing heads and means for carrying out a color penetration method.

Other features which are considered as characteristic for the invention are set forth in the appended claims.

Although the invention is illustrated and described herein as embodied in a repair fixture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read connection with the accompanying drawings, in which:

FIG. 1 is a fragmentary, diagrammatic, cross-sectional overall view of the upper part of an opened reactor pressure vessel with a support ring lowered in the flooded reactor pressure vessel, and a sealing box brought to an abutment through a feedwater distributor, as well as an enlarged view of a portion of the overall view;

FIG. 3 is an an enlarged, fragmentary, top-plan view of the support ring with setting means for displacement of the sealing box.

Figure 2:
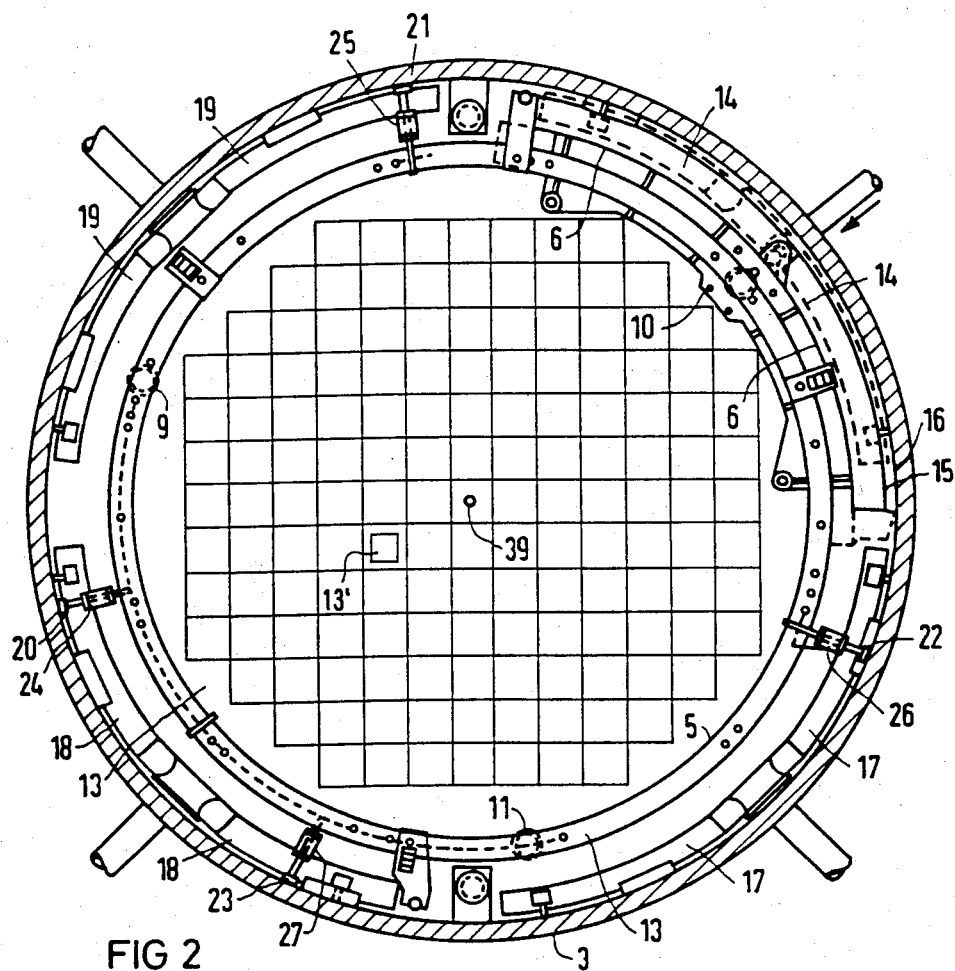
FIG. 2 is a cross-sectional view taken along the line II—II in FIG. 1, in the direction of the arrows.

Referring now to the figures of the drawings in detail and first, particularly, to FIG. 1 thereof, there is seen a cross-sectional view of the upper part of a biological shield 1 of a containment 2, and an opened reactor pressure vessel 3 with a repair fixture 4 according to the invention in place. In the representation of FIG. 1, a support ring 5 and a sealing box 6 of the repair fixture 4 have been lowered into the flooded reactor pressure vessel 3 on a traverse 7 which is suspended from a crane harness 8 of the reactor building. The traverse 7 is lowered into the reactor pressure vessel 3 far enough for support props 9 to 11 of the support ring 5 shown in FIGS. 1 and 2 to sit on an upper rim 12 of a core barrel 13. In this position, the sealing box 6 mounted on the traverse 7 covers a feedwater distributor 14 toward the right side of FIG. 1. The sealing box 6 has a rim 15 provided with a peripheral gasket 16 which abuts the inner surface of the wall of the reactor pressure vessel 3. Three remaining feedwater distributors 17 to 19 shown in FIG. 2 are not covered.

Lateral props 20 to 23, which are adjustable by means of setting cylinders 24 to 27, brace the support ring 5 against the inner surface of the wall of the reactor pressure vessel 3. A pump 28 is attached to the support ring 5, below the sealing box 6. The pump 28 has a suction nipple 29 which is connected by a hose 30 with the interior of the sealing box. A float switch 31 is disposed in the sealing box and is inserted into the circulation caused by the pump 28. An outflow nipple 32 of the pump 28 is secured through a non-illustrated check valve and discharges directly below the pump.

FIGS. 1 and 3 show that the sealing box 6 is connected with the support ring ring 5 through four booms 33 to 36. These booms in turn are displaceable parallel to the axis of symmetry 39 of the support ring, i.e. vertically in two vertical guides 37, 38 attached to the support ring 5 at the top and bottom thereof. FIGS. 1 and 3 also show that the booms 33 to 36 are not only adjustable in height along the guides 37, 38 on both sides of the sealing box 6, but can also be pivoted about these guides. The height or vertical adjustment occurs through the use of the hydraulic cylinders 40, 41 attached on the support ring, parallel to the guides. In order to pivot the booms 33 to 36, two additional hydraulic cylinders 42, 43 are disposed on the support ring. The hydraulic fluid for the cylinders may be pure water to prevent contamination of the flooded pressure vessel. As seen in FIG. 3, each of the cylinders 42, 43 have piston rods which engage the pivotable end of one of the booms 33, 35. The upper and lower ends of the sealing box 6 each carry two guide tracks 44, 45, each of which are displaceably guided in the ends of the booms 33 to 36, although only two tracks are shown. The sealing box 6 is displaced radially relative to the support ring 5, by simultaneously swinging the booms in opposite directions. However, since the sealing box 6 is displaceable along the guide tracks 44, 45 relative to the booms 33, 35 toward both sides, a slide block 46 with a bent guide track 47 can be screwed to the support ring 5 above the sealing box. A pin 48 fastened to the sealing box engages in the bent guide track 47. The pin 48 which is displaceable along the bent guide track 47 of the slide block 46, not only permits the sealing box 6 to be advanced radially during the pivoting of the booms 33 to 36, but simultaneously permits it to be displaced laterally and thus guided laterally past the inserts.

Figure 4:
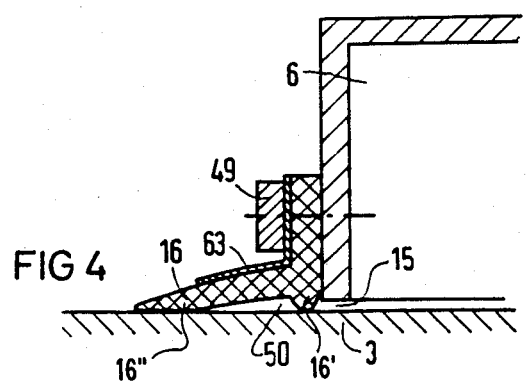
FIG. 4 is an enlarged, fragmentary, cross-sectional view of the gasket of the sealing box.

FIG. 4 shows how the gasket or sealing ring 16 is attached to the rim 15 of the sealing box 6 by a clamping ring 49. FIG. 4 shows a substantially L-shaped contour of the sealing ring 16, which has a fillet 50 in vicinity of the abutment surface. The fillet 50 divides the sealing surface of the sealing ring into a narrow sealing edge 16' and a greatly extended sealing lip 16". The narrow sealing edge will be more easily deformed or pressed into unevennesses by the pressing force of the sealing box, while the sealing lip is preferably applied through the use of the pressure difference. In addition, the sealing lip is pressed against the wall of the reactor pressure vessel by a spring blade 63.

Primary shutdown controls 51', 52' of a water-cooled nuclear reactor, which are disposed outside the biological shield 1 and which are connected to the reactor pressure vessel 3, may have to be repaired or replaced. Heretofore, it was necessary to remove the fuel elements from the core barrel to evacuate these primary shutdown controls, so that the reactor pressure vessel 3 could be evacuated to the extent that the feedwater distributors 14, 17, 18, 19 or the conduit connections would lie above the water surface and could be evacuated. According to the invention, after removal of the pressure vessel cover and of the other inserts, it is sufficient to lower the support ring 5 with the sealing boxes 6 attached thereto with the aid of the crane harness 8 of the reactor building, into the flooded reactor pressure vessel 3. This is done until the support props 9, 10, 11 of the support ring 5 rest on the upper rim 12 of the core barrel 13. In this defined position, the lateral props 20, 21, 23 distributed over the periphery of the support ring can be brought into abutment with the inner surface of the wall of the reactor pressure vessel 3, through the use of the setting cylinders 24 to 27, which are actuated by pressurized water. The support ring 5 is then fixed in height as well as relative to the axis of symmetry 39 of the reactor pressure vessel 3.

The booms 33 to 36 carrying the sealing box can therefore be displaced along the vertical guides 37, 38 with the vertical hydraulic cylinders 40, 41, until the sealing box is vertically centered on the feedwater distributors 14, 17, 18, 19 to be covered. By then swinging the booms 33 to 36 apart by means of the hydraulic cylinders 42, 43 disposed below the sealing box, the sealing box 6 can be pushed radially outwardly over one of the feedwater distributors 14, 17, 18, 19 and against the inner surface of the wall of the reactor pressure vessel 3, until its peripheral rim having the gasket 16 attached thereto is applied against the inner surface of the wall of the reactor pressure vessel. As soon as this is done, the pump 28 which is suspended from the support ring below the sealing box 6 can be turned on and the sealing box can be pumped empty. The water then also runs out of the feedwater distributor 14 and the other covered conduits including conduit connections 14' and the primary shutdown control 51' connected thereto and the water runs into the sealing box 6. The water then runs from the sealing box through the outflow nipple 32 of the pump 28 into the open, flooded reactor pressure vessel 3, and air flows into the sealing box from a venting hose 53. After complete evacuation of the sealing box 6 as well as the conduits discharging therein, the pump 28 automatically turns off through the float switch 31 disposed in the sealing box 6. If an intrusion of water or a sufficient amount of leakage water has accumulated in the sealing box, the float switch 31 switches the pump on again, if necessary.

In some boiling water reactors, guide rods for other inserts extend upward adjacent the feedwater distributors. The guide rods can hinder the radial abutment of the sealing box. In such cases, the sealing box 6 can be lifted over these obstacles by means of the vertical hydraulic cylinders 40, 41 before it abuts against the pressure vessel wall. Alternatively, the sealing box 6 can be moved past the obstacle laterally, by using the slide block 46 adapted to the respective reactor type, if this is easier to perform. The sealing box may also be supported by rotating the entire support ring 5 by means of the crane harness 8, unless the traverse 7 is non-rotationally guided in the reactor pressure vessel. In this way, such obstacles can be by-passed with the sealing box or the sealing box can go behind the obstacles if the distance from the wall is sufficient.

The primary shutdown controls 51', 52' evacuated in the above described manner can thus be removed without first having to remove the fuel elements 13' from the core barrel 13, and the water level in the reactor pressure vessel 3 lowered. After completed servicing or replacement of the primary shutdown controls and after flooding by actuation of the hydraulic cylinders 42, 43, pivoting the booms 33 to 36, the sealing box can be pulled off the wall of the reactor pressure vessel again and can be moved out of the reactor pressure vessel by the crane harness 8, together with the support ring 5.

If the traverse 7 is not secured against rotation in the reactor pressure vessel 3, the other feedwater distributors 17 and 19, which are usually offset relative to each other by 90°, and the conduit connections, can be serviced or replaced in the described manner one after the other. This is done by respective rotation of the traverse 7, with the support ring 5 attached thereto, about a corresponding angle and by renewed lowering. However, if the traverse is secured against rotation, the sealing box 6 as well as the grommets, guides and slide blocks on the support ring 5 must instead be repositioned, so that the traverse 7 need not be rotated about the axis of symmetry 39 of the reactor pressure vessel 3 and instead the support ring 5 may be rotated about the axis of symmetry and can be suspended from the traverse 7 again. For this reason, these structural mambers are secured to the support ring to be unscrewed and rescrewed. Transportation to and from the site as well as storage of the support ring are also considerably simplified in the case of a divided, bolted support ring.

Due to the fact that the inside diameter of the support ring is unobstructed and its clearance is adapted to the diameter of the rim of the core barrel and adjusted thereto during the repair of the primary shutdown controls, the crane of the reactor building remains free for the duration of the repair or replacement. Thus, for example, fuel elements can be repositioned in the meantime. The down time of the nuclear reactor is therefore greatly shortened in addition.

Naturally, the sealing box can not only be used to evacuate certain conduits discharging into the reactor pressure vessel when the vessel is flooded, but also for the purpose of checking and repairing any desired wall areas of the reactor pressure vessel by various methods which would otherwise not be usable. Thus, not only can light sources and television cameras be lodged in the sealing box in order to view the covered wall areas, but remote controllable eddy current probes and devices for carrying out the color penetration method which could otherwise not be used in flooded wall sections, may also be installed in the sealing box. Lastly, the sealing box, which is already pressed firmly against the wall of the reactor pressure vessel as a result of hydrostatic pressure, offers a useful platform for operating remote controllable grinding, milling and welding machines in the sealing box. Thus, all kinds of repairs can be carried out under television control and without appreciable radiation exposure. In this connection, it is especially helpful if windows 54 to 60, 61 and 62 are inserted in the wall of the sealing box 6, as indicated in FIGS. 1 and 3, for external observation by additional television cameras and/or light sources.

In the repair fixture 4 shown as an example in FIGS. 1 to 3, the slide block 46 could be replaced by a hydraulic main cylinder. On the other hand, the two hydraulic cylinders 40, 41 responsible for the vertical displacement of the sealing box could be replaced by slide blocks 40a, 41a adapted to the local condition of the respective reactor type. The slide blocks raise the booms during pivoting as far as is appropriate for that reactor type. The positive guiding of the sealing box by slide blocks or guide cams prevents incorrect manipulations.

We claim:

1. In a water-cooled nuclear reactor including an openable reactor pressure vessel having a wall, feedwater distributors passing through the pressure vessel wall for flooding the pressure vessel, and a core barrel for fuel elements disposed below the feedwater distributors in the reactor pressure vessel, a repair fixture comprising a sealing box enclosing the feedwater distributors in the opened, flooded pressure vessel, means connected to said sealing box for pressing said sealing box liquid-tightly against the reactor pressure vessel wall enclosing at least some of the feedwater distributors, and evacuating means connected to said sealing box for emptying the feedwater distributors enclosed by said sealing box.

2. Apparatus according to claim 1, wherein the feedwater distributors having conduit connections leading to primary shutdown controls of the pressure vessel.

3. Apparatus according to claim 1, including a support ring lowerable into the pressure vessel, said sealing box being mounted on said support ring.

4. Apparatus according to claim 3, including a core barrel disposed in the pressure vessel below the feedwater distributor, said support ring including props engaging the core barrel when said support ring is lowered.

5. Apparatus according to claim 3, wherein said support ring has an outer periphery including lateral props engaging the inner surface of the pressure vessel wall for absorbing radial compressive forces of said sealing box.

6. Apparatus according to claim 5, including setting cylinders displacing said lateral props against the inner surface of the pressure vessel wall.

7. Apparatus according to claim 3, including means connected to said sealing box for displacing said sealing box in radial direction of said support ring.

8. Apparatus according to claim 3, including means connected to said sealing box for displacing said sealing box in circumferential direction of said support ring.

9. Apparatus according to claim 3, wherein said support ring has an axis of symmetry, and including a guide connected to said support ring in which said sealing box is displaceable vertically and parallel to said axis of symmetry.

10. Apparatus according to claim 3, including hydraulic cylinders connected to said sealing box for controlling displacements of said sealing box relative to said support ring.

11. Apparatus according to claim 10, wherein said hydraulic cylinders are operated by pure water preventing contamination of the water of the flooded pressure vessel.

12. Apparatus according to claim 3, including guide cams connected to said sealing box and adapted to a given reactor type for correctly displacing said sealing box in radial direction relative to said support ring.

13. Apparatus according to claim 3, wherein said support ring is divided into sections.

14. Apparatus according to claim 3, wherein said feedwater distributors are in the form of four feedwater distributors connected to the pressure vessel, and including guides being screwed to said support ring and movable along the periphery of said support ring toward said feedwater distributors.

15. Apparatus according to claim 1, wherein the pressure vessel has an axis of symmetry and contains fuel elements including outer fuel elements disposed at a given distance from said axis of symmetry, and the feedwater distributors protrude into the pressure vessel, and including a support ring on which said sealing box is mounted, said sealing box having a depth in radial direction of the pressure vessel being only great enough to cover the protrusion of said feedwater distributors, and said support ring and said sealing box leaving an unobstructed inside diameter of the pressure vessel being more than twice said given distance when said sealing box is pressed against the pressure vessel wall.

16. Apparatus according to claim 1, wherein said sealing box has rims to be pressed against the pressure vessel wall, and gaskets disposed on said rims.

17. Apparatus according to claim 16, wherein each of said gaskets is substantially L-shaped and has a longer and a shorter leg, said longer leg being pressed against the pressure vessel wall and having a narrow sealing edge and a wide sealing lip, and a shallow fillet disposed between said sealing lip and sealing edge.

18. Apparatus according to claim 1, wherein said evacuating means include a pump.

19. Apparatus according to claim 18, including a float switch disposed in said sealing box and connected to said pump for controlling said pump.

20. Apparatus according to claim 1, wherein the pressure vessel has a given water level, and including an air venting hose connected to said sealing box and leading above the water level.

21. Apparatus according to claim 1, wherein said sealing box is at least partly transparent.

22. Apparatus according to claim 21, including transparent windows disposed in said sealing box.

* * * * *